United States Patent
Wingen et al.

(10) Patent No.: US 6,520,569 B2
(45) Date of Patent: Feb. 18, 2003

(54) SUNSHADE ARRANGEMENT FOR A TRANSPARENT MOTOR VEHICLE PART AND MOTOR VEHICLE ROOF WITH SUNSHADE ARRANGEMENT

(75) Inventors: Bernhard Wingen, Feldkirchen (DE); Wolfgang Seifert, Beilngries (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/837,763

(22) Filed: Apr. 19, 2001

(65) Prior Publication Data

US 2001/0054833 A1 Dec. 27, 2001

(30) Foreign Application Priority Data

Apr. 19, 2000 (DE) .......................... 100 19 664

(51) Int. Cl.[7] .................................................. B60J 7/00
(52) U.S. Cl. ...................................... 296/214; 296/215
(58) Field of Search .......................... 296/216.03, 214, 296/215, 220.01

(56) References Cited

U.S. PATENT DOCUMENTS

| 4,872,722 A | 10/1989 | Farmont |
| 4,978,165 A | * 12/1990 | Schreiter et al. ........ 296/214 X |

FOREIGN PATENT DOCUMENTS

| DE | 3223136 | * 3/1983 | ................. 296/214 |
| DE | 44 24 188 C1 | 12/1995 | |
| DE | 195 38 551 C1 | 10/1996 | |
| DE | 197 50 713 C1 | 12/1998 | |
| DE | 197 50 715 C1 | 12/1998 | |
| DE | 198 44 779 C1 | 11/1999 | |
| JP | 4627 | * 1/1983 | ................. 296/214 |

* cited by examiner

Primary Examiner—Dennis H. Pedder
(74) Attorney, Agent, or Firm—Nixon Peabody LLP; David S. Safran

(57) ABSTRACT

A sunshade arrangement for a transparent motor vehicle part, especially for a motor vehicle roof with a transparent roof section. The sunshade arrangement has at least one sunshade element which is located on the motor vehicle part or under the roof section, which can be extended to the front edge and/or the rear edge of the motor vehicle part or a roof cutout, and which is movably supported in the lengthwise direction of the motor vehicle so as be movable both in an at least partially extended position and also in the retracted position.

20 Claims, 2 Drawing Sheets

SUNSHADE ARRANGEMENT FOR A TRANSPARENT MOTOR VEHICLE PART AND MOTOR VEHICLE ROOF WITH SUNSHADE ARRANGEMENT

BACKGROUND OF THE INVENTION

1. Field of the Invention

The invention relates to a sunshade arrangement for a transparent motor vehicle part, especially for a motor vehicle roof with a transparent roof section, the sunshade arrangement containing at least one sunshade element which is located on the motor vehicle part or under the roof section, which can be extended to the front edge or the rear edge of the motor vehicle part or a roof cutout, and which is movably supported in the lengthwise direction of the motor vehicle. The invention is also directed to a motor vehicle roof with such a sunshade arrangement.

2. Description of Related Art

An arrangement of two permanently installed shades is known, the permanently installed shades are located under a glass roof roughly in the middle of the glass roof and the shades can be extended forward or backward. Even when the shades are not being used, especially with the roof opened and when the cover is pushed to the rear, these shades are located transversely over the roof opening and adversely affect vision.

German Patent DE 197 50 713 C1 discloses a motor vehicle roof with at least one transparent roof part under which there is a cover device. The cover device according to one embodiment contains two pull-out shades with winding shafts which are movably supported in the lengthwise direction of the roof, while the ends of the two shades are securely attached to the front end or the back end of the transparent roof part. The two winding shafts are connected to one another by a coupling mechanism such that the displacement motion of one winding shaft produces a corresponding opposite displacement motion of the other winding shaft so that by actuating or operating only one of the two shades the cover device or the two shades can be opened equally proceeding from the middle of the roof. This displacement motion of the two winding shafts thus determines the opening of the cover device, the displacement motion of the winding shafts always resulting in the respective blind being extended or retracted. There is no change in the position of the unrolled opened shade by displacement along the motor vehicle roof.

German Patent DE 44 24 188 C1 discloses a shade arrangement for shielding the transparent roof area of motor vehicles. The shade arrangement comprises two shades next to one another with two winding rollers and two blind webs. The winding shafts are located at an obtuse angle to one another for matching to the transverse arch of the roof contour.

SUMMARY OF THE INVENTION

The primary object of the present invention is to provide a sunshade arrangement with greater flexibility in its use.

This object is achieved by a sunshade arrangement in which the sunshade element can be moved both in an at least partially extended position and also in the retracted position. When the sunshade element is in its retracted state and not providing shading, unhindered viewing is desired. The present sunshade can be pushed to the position which is favorable for this purpose. Also, the sunshade element can be moved in a partially or entirely extended position, then the length of the sunshade elements can be shortened or lengthened. The sunshade arrangement is especially suitable for transparent roof parts, but can also be used for side windows and front or back windows.

Advantageous embodiments of the invention are given below.

Preferably, the sunshade element is attached to a cross member which is movably supported in the lengthwise direction of the motor vehicle. The cross member offers the necessary stability and protected accommodation for an easily mounted sunshade element and an optical cover, for example. The cross member can thus be formed as a movable roof headliner part.

When there is a second extendible sunshade element for the part of the roof cutout which is uncovered by the first sunshade element and the second extendible sunshade element is supported either on the front edge or the rear edge of the roof cutout or on the cross member, different adjustments of shading for the front and the rear vehicle interior can be selectively accomplished.

Even if there is a drive for moving the sunshade element or the cross member, manual movement is also possible as an alternative.

Likewise the sunshade element or elements can be extended or retracted by a drive and also manually.

In addition to different staggered or continuous intermediate positions, the movably supported sunshade element or the cross member can be moved onto the front edge and onto the rear edge of the roof section.

If at least one sunshade element in the transverse direction of the roof is divided into at least two independent sunshade component elements, shading can be made more flexible.

Feasibly, the cross member can be moved both with the sunshade elements which cover the roof section extended and also with the sunshade elements which clear the roof section accommodated on the cross member.

In one preferred embodiment, the cross member with the sunshade elements supported on the cross member is sized to match to the transverse roof arch. The middle area of the cross member is offset upward so that the head space of the passengers is not adversely affected by the cross member and the sunshade element. This is especially advantageous for highly arched roofs. The cross member can contain two legs and the middle section of the cross member can be located higher relative to the vehicle interior than the outer, movably supported leg ends.

To use the advantages of the elevated middle area, each leg of the cross member then feasibly contains one component sunshade element.

Preferably, the cross member is movably supported on the side guide rails on the motor vehicle roof.

For variable use, especially with the roof opened, it is a good idea to provide the capability of removing the cross member with the sunshade element as a unit out of its arrangement from the motor vehicle roof.

Preferably, at least one of the sunshade elements or the component sunshade elements is a pull-out shade or an awning.

The roof section can be a fixed glass roof or plastic roof or can have at least one openable transparent cover.

Embodiments of the sunshade arrangement are described below with reference to the drawings.

DETAILED DESCRIPTION OF THE INVENTION

Figure 5:
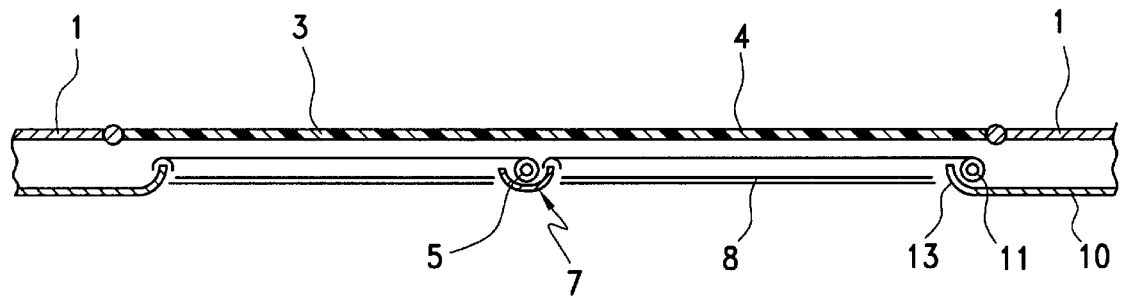
FIG. 5 shows an embodiment with a permanently installed roof.

A motor vehicle roof of a passenger car with a fixed roof skin 1 contains a transparent roof section 2 which is formed, for example, as a sliding and lifting roof or a spoiler roof with two successive glass covers 3, 4 (FIGS. 1 & 2) which can be opened or the transparent roof section can also be a permanently installed glass roof (FIG. 5). A sunshade arrangement for at least partially covering the underside of the roof section 2 or the glass cover 3, 4 contains a shade 5 as the extendible or pull-out sunshade element with a winding axle 6 which is rotatably mounted on the cross member 7. The cross member 7 extends over the width of the roof section 2 and is movably supported on lateral rails 8 which extend in the lengthwise direction of the motor vehicle or the roof and can be fixed in different positions in the lengthwise direction. The shade 5 can be unwound from an opened position in which the shade is completely wound and accommodated on the cross member 7, and can be extended or pulled out forward to the front edge 9 of the roof section 2 (see FIG. 1). The front edge 9 of the roof section 2 (the roof section is transparent from the interior) is formed, for example, by a headliner 10 which borders the free roof cutout underneath the transparent roof section 2. The shade 5 can be extended or pulled out manually or by means of a drive (not shown) and which, for example, moves the side journals which are located on the front end of the shade 5 and which are guided on the lateral guide rails 8.

A second shade 11 can be rotated by means of its winding axle 12 on the cross member 7 and can be extended or pulled out towards the rear edge 13 of the roof section 2. Here too, the rear edge 13 can be formed by the headliner 10 and extension or pulling out can be accomplished manually or via a drive.

Figure 1:
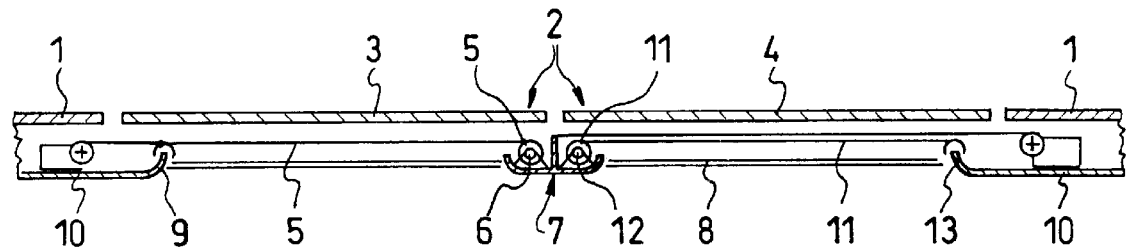
FIG. 1 shows a motor vehicle roof with a transparent roof section and with a sunshade arrangement in a schematic, lengthwise section.
Figure 2:
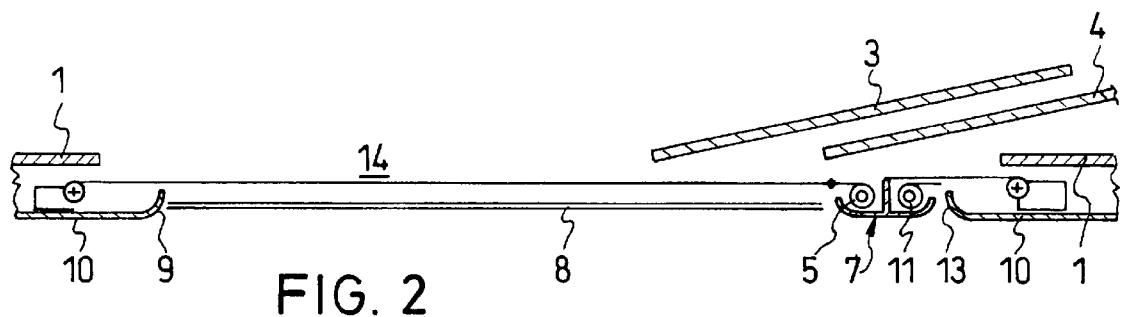
FIG. 2 shows the motor vehicle roof in a lengthwise section with the sunshade arrangement pushed to the rear and with the cover of the roof opened.

The cross member 7 can be moved or displaced by means of manual control or by means of a drive on the lateral guide rails 8 with the shade 5, 11 opened or closed, for example, from the middle position shown in FIG. 1 on the rear edge 13 of the roof section 2 or the free roof cutout (see FIG. 2). When the cross member 7 is moved with the closed shade 5, 11 pulled out, the front shade 5 is unwound when movement is towards the rear, while the rear shade 11 is being wound.

In the position shown in FIG. 2, the cross member 7 with the two wound shades 5, 11 is in its rear position so that the roof cutout is uncovered. The two glass covers 3, 4 are moved to the rear on top of one another in the spoiler position raised to the rear and clear a large roof opening 14. When a rear section of the roof cutout is to be covered against incident solar radiation, the cross member 7 is moved forward by a corresponding distance, either the end of the rear shade 11 is attached to the rear edge 13 before movement and the shade 11 is unwound when the cross member 7 is moved, or the shade 11 is unwound after the cross member 7 is moved.

Figure 3:
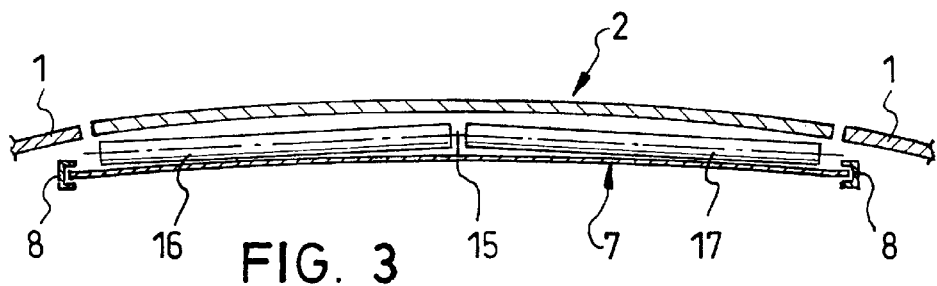
FIG. 3 shows another embodiment of the sunshade arrangement in a cross section of the motor vehicle roof in which the cross member is sized to match the transverse arch of the roof section or of the glass cover.

FIG. 3 shows a transverse cross section of an embodiment in which the cross member 7 is sized to match to the transverse arch of the roof section 2 or of the glass cover 3, 4 and the cross member 7 has a bent shape with a middle section 15 which is located higher relative to the vehicle interior than the side guide rails. When the cross member 7 is moved, the free head space of the passengers is less adversely affected than with an essentially straight cross member 7. The cross member 7 can also have two roughly linear legs which are connected to one another on their inner middle section 15 at an angle of less than 180°.

For better matching to the bent or angled cross member 7, the front and the rear sunshade element or the respective shade 5, 11 is divided over the width of the roof section 2 into two component shades 16 and 17 (see FIG. 3) which can be operated jointly or independently of one another.

Figure 4:
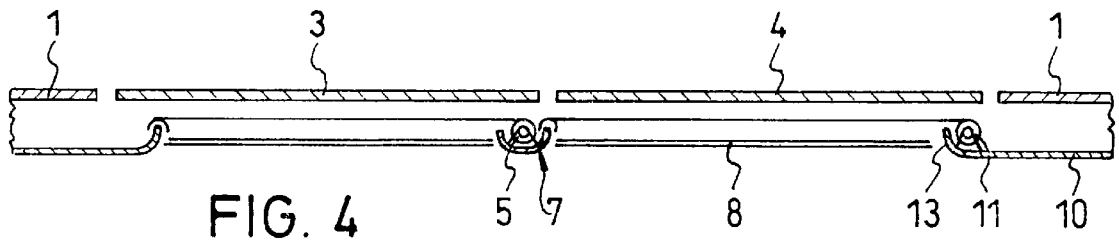
FIG. 4 shows yet another embodiment of the sunshade arrangement in a lengthwise section of the motor vehicle roof in which the second shade is located on the rear edge of the rear head liner.

According to another embodiment (see FIG. 4), the second shade 11 is located on the rear edge 13 of the rear headliner 10. The shade 11 can be pulled out and attached to the cross member 7 so that the rear shade 11 is further extended by continuing to move the cross member 7.

In the described embodiments, the sunshade elements are the shades 5, 11. But, instead of pull-out shades with a continuous tarpaulin, awnings, louver-like sunshade elements or the like can also be used.

The sunshade element or the shade can also, itself, be movably supported on the lateral guide rails 8, so that an independent cross member is not necessary and its function is assumed by the sunshade element or the shade.

Figure 6:
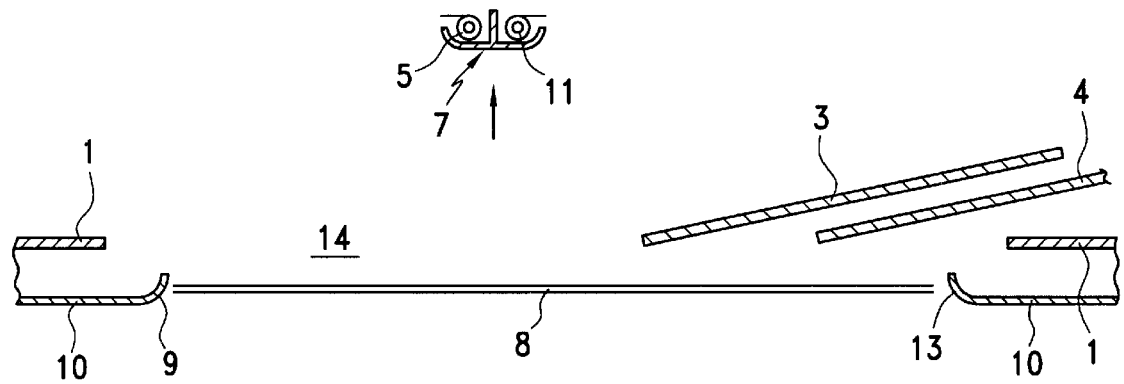
FIG. 6 is a representation of the ability to remove the cross member and shades from the roof as a unit.

The cross member 7 can be removed from the roof opening as a unit with the shades(s) 5, 11 as represented in FIG. 6.

What is claimed is:

1. A sunshade arrangement for a transparent part of a motor vehicle, the sunshade arrangement comprising:
    at least one sunshade element which is adapted for mounting on the vehicle adjacent the transparent part, the at least one sunshade element including a mounted part and an extendible part extendible relative to the mounted part in a lengthwise direction of the motor vehicle to at least one of a front edge and a rear edge of the transparent part;
    wherein the mounted part of the at least one sunshade element is movable in said lengthwise direction while said extendible part is in either of an at least partially extended position and a retracted position.

2. The sunshade arrangement as claimed in claim 1, wherein the at least one sunshade element is attached to a cross member which is movable in said lengthwise direction in an installed condition on a motor vehicle.

3. The sunshade arrangement as claimed in claim 2, wherein the at least one sunshade element comprises first and second extendible sunshade elements, the second extendible sunshade element being provided for covering a part of the transparent motor vehicle part which is uncovered by the first extendible sunshade element and being supported on one of a front edge and a rear edge of the cross member.

4. The sunshade arrangement as claimed in claim 2, further comprising a drive for moving said at least one sunshade element and the cross member.

5. The sunshade arrangement as claimed in claim 1, wherein a drive is provided which extends or retracts the at least one sunshade element.

6. The sunshade arrangement as claimed in claim 2, wherein the at least one sunshade element is unwindable from a completely wound position on the cross member into an unwound position extending to at least one of the front edge and rear edge of the transparent motor vehicle part.

7. The sunshade arrangement as claimed in claim 1, wherein the at least one sunshade element is divided in a transverse direction of the transparent motor vehicle part into at least two independent sunshade component elements.

8. The sunshade arrangement as claimed in claim 3, wherein the cross member is movable both with the at least one sunshade element in the extended position and also with the at least one sunshade element accommodated on the cross member.

9. The sunshade arrangement as claimed in claim 2, wherein the cross member is sized to match to the transparent motor vehicle part.

10. The sunshade arrangement as claimed in claim 2, wherein the cross member comprises two legs, the two legs having leg ends which are movably supported, and a middle section of the cross member being located higher than the leg ends.

11. The sunshade arrangement as claimed in claim 10, wherein a sunshade element is provided on each leg of the cross member.

12. A motor vehicle roof with a sunshade arrangement and a transparent roof section, the sunshade arrangement comprising:

at least two sunshade elements which are located under the roof section, each of the at least two sunshade elements including a mounted part and an extendible part extendible relative to the mounted part to at least one of a front edge and a rear edge of a roof cutout containing the transparent roof section;

wherein the mounted part of each of the at least two sunshade elements are movable in a lengthwise direction of the motor vehicle while said extendible part is in either of an at least partially extended position and a retracted position.

13. The motor vehicle roof as claimed in claim 12, wherein the roof section is a fixed glass roof.

14. The motor vehicle roof as claimed in claim 12, wherein the roof section has at least one openable transparent cover.

15. The motor vehicle roof as claimed in claim 12, wherein the at least one sunshade element is attached to a cross member which is movable in the lengthwise direction of the motor vehicle.

16. The motor vehicle roof as claimed in claim 15, wherein the cross member is movably supported on side guide rails of the motor vehicle roof.

17. The motor vehicle roof as claimed in claim 15, wherein the cross member and the at least one sunshade element are removable as a unit from the motor vehicle roof.

18. The motor vehicle roof as claimed in claim 12, wherein the at least one sunshade element is divided in a transverse direction of the transparent motor vehicle part into at least two independent sunshade component elements.

19. The motor vehicle roof as claimed in claim 18, wherein at least one of the component elements is a pull-out shade or an awning.

20. A sunshade arrangement for a transparent part of a motor vehicle, the sunshade arrangement comprising:

at least one sunshade element for mounting adjacent the transparent part, the at least one sunshade element being extendible in a lengthwise direction to an extent substantially equal to a distance to at least one of a front edge and a rear edge of the transparent part;

wherein the at least one sunshade element is movable in said lengthwise direction both in an at least partially extended position and also in a retracted position, wherein the at least one sunshade element is attached to a cross member which is movable in said lengthwise direction in an installed condition on a motor vehicle.

* * * * *